T. B. TAYLOR.
Cotton-Press.
No. 213,470. Patented Mar. 18, 1879.
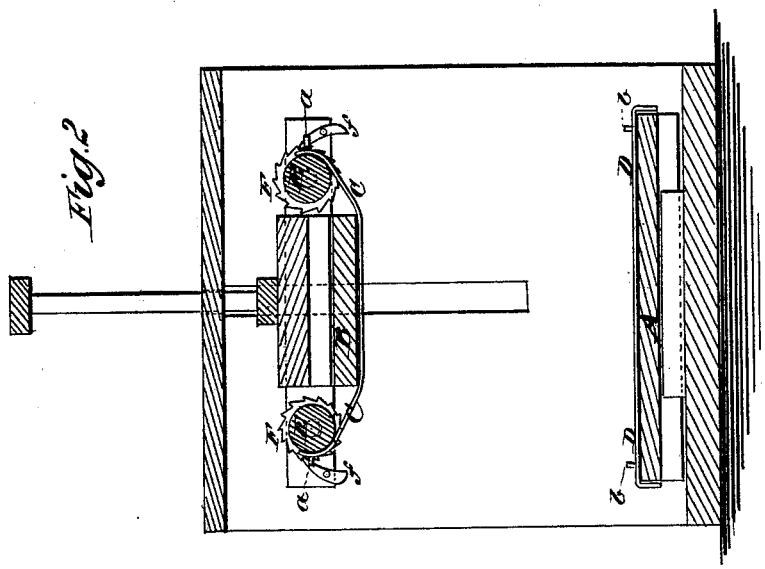
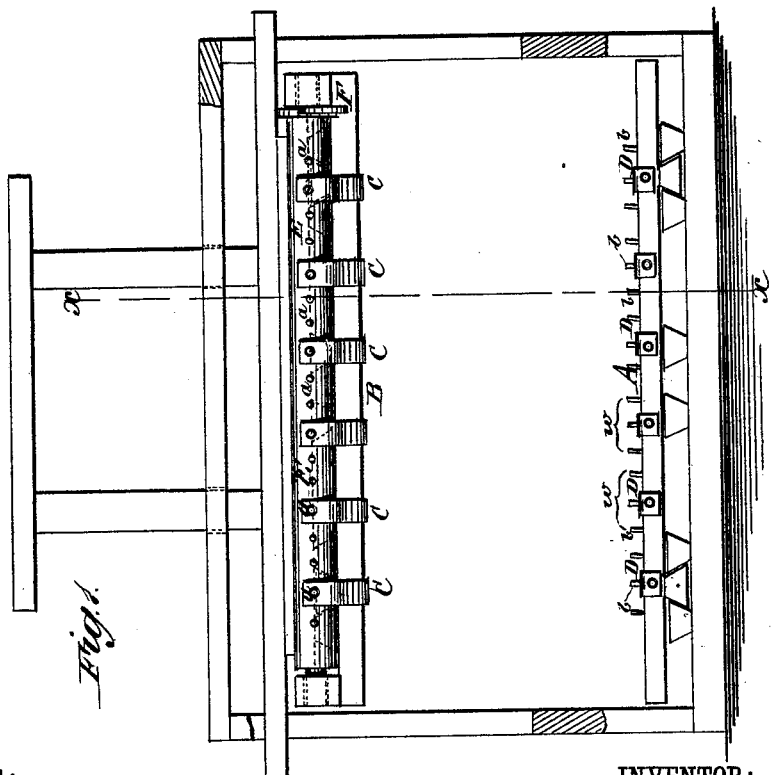
WITNESSES:
Francis McArdle
C. Sedgwick
INVENTOR:
T. B. Taylor
BY Munn &co
ATTORNEYS.

UNITED STATES PATENT OFFICE.

THOMAS B. TAYLOR, OF MOUNT MEIGS, ALABAMA.

IMPROVEMENT IN COTTON-PRESSES.

Specification forming part of Letters Patent No. 213,470, dated March 18, 1879; application filed July 22, 1878.

*To all whom it may concern:*

Be it known that I, THOMAS B. TAYLOR, of Mount Meigs, in the county of Montgomery and State of Alabama, have invented a new and useful Improvement in Retaining the Compression on Cotton-Bales, of which the following is a specification:

The object of my invention is to provide a new mode and device for baling cotton, and by which the cotton-bale is prevented from swelling out, owing to the slackness of the band, as it now does when removed from the compress, in order that it may occupy less stowage-room in shipping, and to retain the said compression without wasting the old bands, which thus may be utilized again in the baling of cotton without deterioration in market-value.

The invention will first be described in connection with the drawings, and then pointed out in the claim.

Figure 1 represents a sectional side elevation of a press adapted for use in applying my present improvement. Fig. 2 is a vertical cross-section of the same, taken on the line $x$ $x$ of Fig 1.

Similar letters of reference indicate corresponding parts.

In the mode heretofore employed in compressing baled cotton for shipping, all the iron bands are first cut off and removed from the bale, which is then compressed (with nothing on it but the bagging) to six or eight inches, after which the long iron bands are passed around the bale through the grooves of the bed-block and follower, and contracted as tight as possible, the two ends being then fastened together at one side of the bale. This leaves, necessarily, a slackness of the band, in consequence of which the bale, when released from the press, expands to about twice the thickness of that to which it was compressed, and the bands, being cut, are damaged or spoiled.

My invention is designed to save the old bands by enabling their removal to be made without cutting them, and to retain the bale at the smallest size to which it was compressed. Unlike ordinary baling presses or compresses, the grooves through which the bands are now passed around the bale are omitted, the bed-block A being smooth and plain upon its upper surface, and the follower B equally plain and smooth upon its lower surface.

The bale-band is made in two parts, C and D, the upper part, C, being stretched on the face of the follower B by rollers E on opposite vertical edges of the follower, said rollers being provided with pins $a$, upon which the ends of the band are hooked and held, and with ratchet-wheels F and pawls $f$, to prevent the roller from turning back and slackening the tie until it is necessary to take one off to fasten on the bale. The lower part, D, of the band is kept in place on the bed-block A by pins $b$ at each end.

While the bale is in the compress the ends of the upper band, C, are tied to the ends of the lower band, D, on the opposite vertical sides of the bale.

The top and bottom bands, C D, may be made of only the length of the width of the bale, and their ends connected at the opposite vertical sides by separate short straps, thus making a tie of four parts.

By this device the cotton-bales may be retained to one-half of their usual size, and the old ties removed without cutting or damaging them, so as to be used over again for subsequent packing or baling of cotton.

The short or divided bale-band may be used on any ordinary cotton-press without changing the bed-block or follower by placing it slightly diagonally across the band-grooves in the working-surfaces of the said follower and bed-block, and retaining it in said position while pressing it upon the bale.

The short divided bands C D should be placed on the follower-block B and bed A in sections of three bands in each section, as indicated by the fastening-pins $b$, contained within the brackets $w$ in Fig. 1, so that if the middle bands should press upon the old band one of its side bands may be used instead.

Having thus fully described my invention, I claim as new and desire to secure by Letters Patent—

The combination of the bed-block A, the follower B, and the two-part bale-band C D, the part C held to follower by rollers having pins $a$, and the part D to bed-block by pins $b$, as shown and described.

THOMAS BURGE TAYLOR.

Witnesses:
ADOLPHUS GUSTAVUS SMITH,
REUBEN HENRY BREWER.